Figure 1:
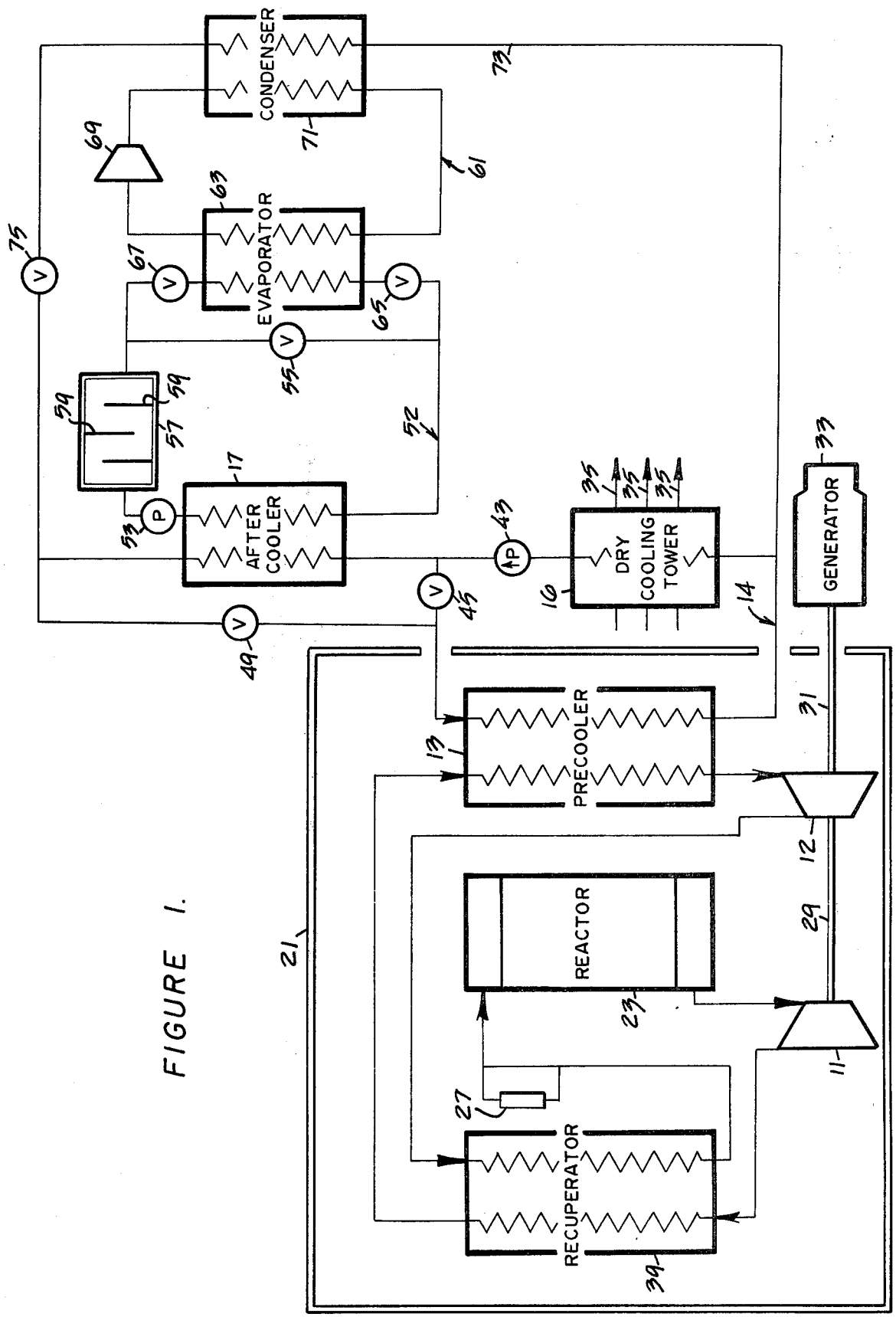

United States Patent [19]

Morse et al.

[11] 4,144,723

[45] Mar. 20, 1979

[54] POWER PLANT SECONDARY COOLANT CIRCUIT

[75] Inventors: David C. Morse, La Jolla; Daniel L. Vrable, San Diego, both of Calif.

[73] Assignee: General Atomic Company, San Diego, Calif.

[21] Appl. No.: 757,450

[22] Filed: Jan. 6, 1977

Related U.S. Application Data

[63] Continuation-in-part of Ser. No. 666,598, Mar. 15, 1976, abandoned.

[51] Int. Cl.² .................. F25B 25/00; F25B 7/00; F25B 1/00; F25B 1/10
[52] U.S. Cl. ............................... 62/332; 62/335; 62/501; 62/510
[58] Field of Search .............. 62/500, 501, 502, 332, 62/114, 510, 335

[56] References Cited

U.S. PATENT DOCUMENTS

| | | | |
|---|---|---|---|
| 2,494,120 | 1/1950 | Ferro, Jr. | 62/510 |
| 2,519,010 | 8/1950 | Zearfoss, Jr. | 62/500 |
| 3,097,504 | 7/1963 | Quick et al. | 62/332 |
| 3,266,261 | 8/1966 | Anderson | 62/501 |
| 3,300,991 | 1/1967 | Carney | 62/335 |
| 3,301,000 | 1/1967 | Holbay | 62/501 |
| 3,456,453 | 7/1969 | Carbonell | 62/332 |
| 3,520,146 | 7/1970 | Arnold | 62/510 |
| 3,524,327 | 8/1970 | Carbonell et al. | 62/52 |
| 3,543,534 | 12/1970 | Pacault et al. | 62/510 |
| 3,621,653 | 11/1971 | Pacault et al. | 62/333 |
| 3,621,656 | 11/1971 | Pacault et al. | 62/510 |
| 3,668,884 | 6/1972 | Nebgen | 62/510 |

*Primary Examiner*—Lloyd L. King
*Attorney, Agent, or Firm*—Fitch, Even, Tabin & Luedeka

[57] ABSTRACT

In one embodiment, a closed cycle gas turbine system employs a precooler for cooling the gas prior to compression. A closed loop coolant circuit for the precooler includes a primary heat exchanger. A secondary heat exchanger is provided which may be employed during periods of peak demand on the turbine system to provide additional cooling for the coolant in the closed loop coolant circuit for the precooler. The secondary heat exchanger may also be employed to transfer heat in the reverse direction during periods of time in which the primary heat exchanger is operating at high effectiveness to provide storage of a fluid at low temperature to enhance operation in the initially described mode. In another embodiment, a similar coolant circuit operates in conjunction with a condenser for a steam power electrical generating facility.

16 Claims, 2 Drawing Figures

POWER PLANT SECONDARY COOLANT CIRCUIT

This is a continuation-in-part of an application Ser. No. 666,598, filed Mar. 15, 1976, by David C. Morse and Daniel L. Vrable, assigned to the assignee of the present invention and now abandoned.

This invention relates generally to power plants of a type including heat removal means and, more particularly, to an improved coolant circuit which is selectively operable for supplying coolant to the heat removal means, the power plant preferably being embodied in a gas-cooled nuclear reactor system for producing electrical power.

High temperature gas-cooled nuclear reactors offer significant advantages over other types of nuclear reactors for electrical power production. Such reactors typically employ a compressible gas which is circulated over the reactor core to cool the core. Heat from the gas is then removed for the purpose of generating electrical power. The heat may be removed through the utilization of boilers wherein a steam cycle is used to operate electrical generating apparatus. The coolant gas from the reactor may also be used directly in a closed cycle gas turbine system which is characterized by high efficiency and is readily adaptable to dry air cooling. The latter factor minimizes environmental impact, since large make-up water requirements and/or the discharge of large quantities of warm water are avoided. Moreover, the elimination of the need for large quantities of water provides for greater flexibility in the selection of a plant site.

The invention, although particularly suited for use in gas cooled nuclear reactor systems, may be used with other primary sources of heat. Thus, the heat source may employ combustion of fossil fuel, nuclear reaction, or any other suitable source of heat. The invention is especially useful where only dry air cooling is permissible, commonly for reasons of water conservation. Similarly, a variety of converters such as a gas turbine or steam plant may be operated by the heat source.

In a typical closed cycle gas turbine which is fed by gas from a high temperature heat source a number of turbine stages drive one or more compressors, and an electric generator, which may or may not employ a common shaft. The necessary heat rejection of the turbine is spread over a wide range of temperature because a gas cycle inherently incorporates a wide temperature range of heat rejection as opposed to that of a steam cycle, which involves the essentially constant temperature process of steam condensation. As a result, much lower quantities of coolant suffice to remove the same quantity of rejected heat in a gas cycle as opposed to a steam cycle.

Hot gas leaving the turbine may be further usefully employed to preheat the gas flow entering the heat source by means of a recuperator. However, the lowest temperature to which the working gas can be cooled by internal heat exchange must remain above that of the gas at the compressor delivery, which is generally of the order of 350°–400° F. (177°–204° C.)

To complete the thermodynamic cycle, the gas temperature is further reduced in a precooler and then returned to the intake of the compressor. From the compressor, which may employ interstage cooling, the gas passes, via the low temperature side of the recuperator, if such is used, back to the intake of the heat source.

A steam power plant may function in a similar manner. For example, a condenser is commonly employed, similar to the precooler of a gas turbine system, as a heat removal means for cooling a working fluid used in connection with the heat source.

The heat extracted from the precooler (and also from any intercoolers used) or from the condenser of a steam system, being at too low a temperature level for further internal use, is usually rejected to an external heat sink. In the interest of both plant bulk and of efficiency, the effective temperature of this heat sink should be as low as possible.

Where atmospheric air is used as a heat sink, the plant performance is much influenced by the ambient temperature. In these circumstances, plant efficiency and output may be adversely influenced by a high ambient temperature. The result is that higher daytime temperatures mean poorer performance of the system than during the night. Since maximum electrical load usually occurs during the day, this situation is the reverse of what is most desirable.

Conversely, during the night time electrical load demand is reduced while at the same time ambient temperature is also reduced resulting in a higher overall efficiency of operation for the system. Thus, the lowest load demand coincides with the maximum plant output or efficiency based upon ambient air temperature.

It is an object of the present invention to provide an improved power plant of a type including heat removal means which in turn requires cooling.

Another object of the invention is to provide such a power plant system in which available cooling capacity may be stored and then selectively used during periods of peak electrical demand.

A further object of the invention is to provide a power plant such as a closed cycle gas turbine system or a steam power plant, for example wherein high operational efficiency may be maintained during periods of high ambient temperature.

Other objects of the invention will become apparent to those skilled in the art from the following description, taken in connection with the accompanying drawings.

In the drawings, FIG. 1 is a schematic diagram of a closed cycle gas turbine system constructed in accordance with the invention and used in connection with a nuclear reactor system.

Figure 2:
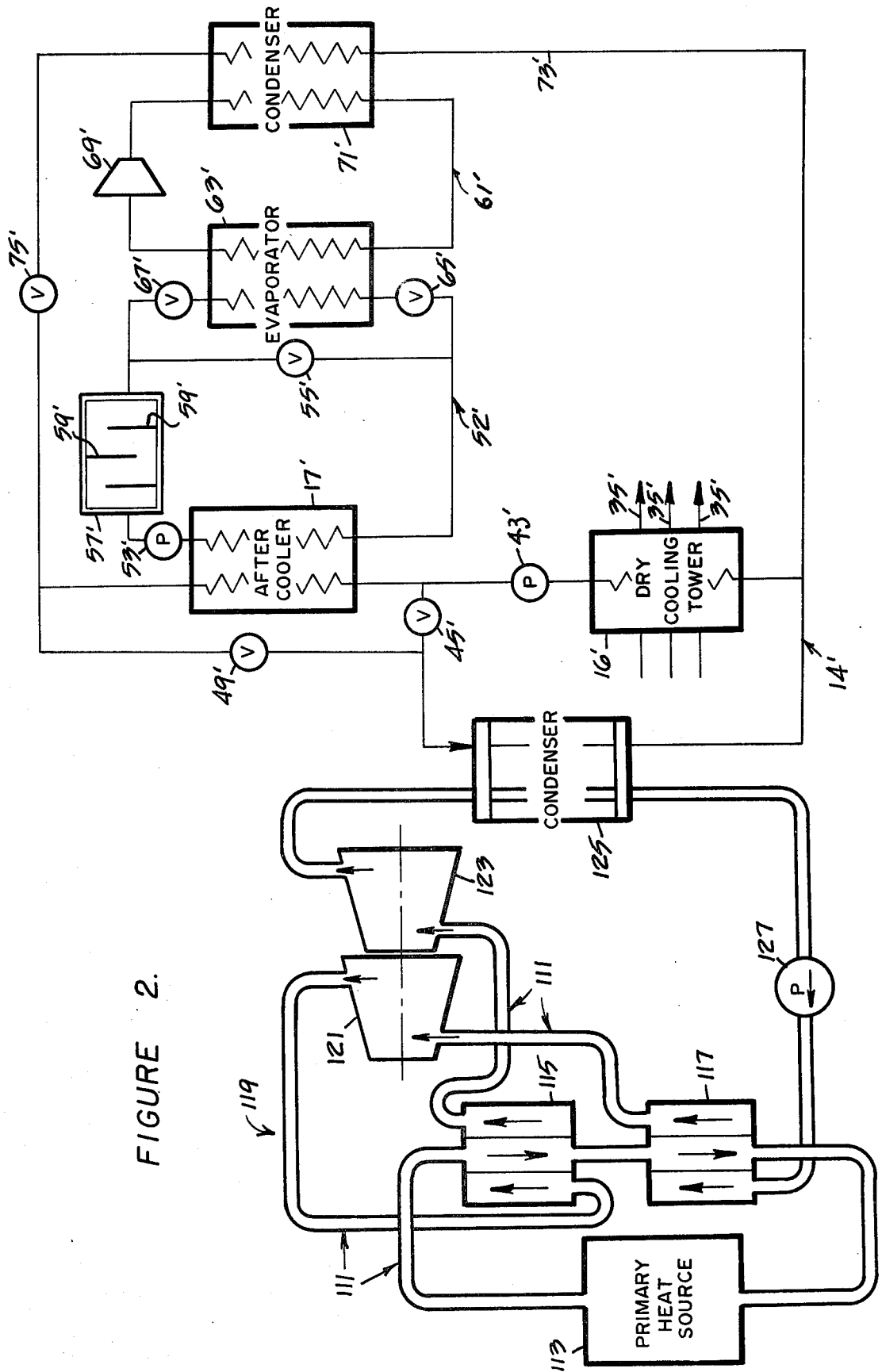

FIG. 2 is a similar schematic diagram of a steam power plant constructed in accordance with the invention.

Very generally, the closed cycle gas turbine system according to the invention and illustrated in FIG. 1 includes turbine means 11, and compressor means 12. A gas is circulated for expansion in the turbine means and compression in the compressor means. A precooler 13 is employed to cool the gas prior to compression in the compressor means. A closed loop primary coolant circuit 14 circulates the coolant through the precooler and includes a primary heat exchanger 16, such as a dry-cooling tower, for cooling the coolant in the primary coolant circuit. A secondary heat exchanger 17 is also provided and at least a portion of the primary coolant in the primary coolant circuit may be selectively directed through the secondary heat exchanger for further cooling the primary coolant.

Referring now more particularly to FIG. 1, the closed cycle gas turbine system illustrated therein is employed in a nuclear reactor system of the high temperature gas-cooled type. High temperature gas-cooled reactors are known in the art and will not be described in particular detail herein. The reactor system of the illustrated embodiment includes a prestressed concrete reactor vessel 21 which encloses the reactor 23 and its associated structures and ducting, not shown, and in which the entire primary coolant system and closed cycle gas turbine system of the invention are also enclosed.

The primary reactor coolant is preferably helium and in a system wherein the reactor is of approximately 3,000 mega-watts thermal capacity, it can be expected that the inlet temperature of the helium is approximately 927° F. (497° C.) and that the outlet temperature of the helium is approximately 1500° F. (816° C.) A coolant gas inventory control system 27 is provided through which some of the coolant gas may be bled off or bled in to thus regulate the total inventory of coolant gas in the reactor system. This also regulates the overall operating pressures within the closed cycle gas turbine system.

The closed cycle gas turbine system includes the turbine 11 and the compressor 12, each of which may be a single stage or multiple stage as desired. A shaft connection 29 or other suitable mechanical drive means couples the turbine 11 to the compressor 12. Similarly, a shaft connection 31, having suitable seals, not shown, passes out of the reactor vessel 21 to a generator 33 for producing electrical power.

The precooler 13 is used for cooling the gas prior to compression in order to reduce the amount of work necessary to compress the gas. The closed loop primary coolant circuit 14 is employed for the precooler 13 which circulates coolant from outside the reactor core through the precooler 13. The primary heat exchanger 16, which is illustrated as a dry-cooling tower, is connected in series in the primary coolant circuit and cools the water flowing in the primary coolant circuit by the flow of air, indicated by the arrows 35. Preferably, the primary coolant circuit is pressurized to permit the water therein to be heated above the atmospheric boiling point. Typical operating temperatures may be an inlet temperature to the heat exchanger 16 of 280° F. (138° C.) and an outlet temperature from the heat exchanger 16 of about 85° F. (29° C.)

The turbine 11 provides all the necessary power to drive the compressor 12 and also drives the electrical generator 33. As the working gas leaves the turbine 11, all useful work has been extracted insofar as expansion is concerned. Nevertheless, the gas exiting the turbine 11 still has a substantial amount of thermal energy. This thermal energy is transferred to the compressed gas prior to its circulation through the reactor 23 by the use of a recuperator 39. Typical temperatures of gas exiting the turbine 11 are about 990° F. (532° C.) In a suitably constructed recuperator, the temperature of the gas prior to entry into the precooler 13 may be dropped to about 441° F. (227° C.) and in doing so, the temperature of the compressed gas exiting the compressor 12 may be raised from about 350° F. (177° C.) to about 927° F. (497° C.).

In operating the illustrated system, gas passes through the reactor 23 and enters the turbine 11 for expansion. After expansion, some of the heat from the gas is extracted as it passes through the recuperator 39 and enters the precooler 13. In the precooler 13, the gas is cooled down for compression in the compressor 12. After compression in the compressor 12, the gas is circulated back through the recuperator to increase its temperature and then passes down through the reactor 23 once more.

The precooler coolant circuit is a closed loop circuit in which the circulating power is provided by a pump 43. Output from the pump 43 may be directed through a valve 45 to the precooler 13, and from there returned to the input side of the heat exchanger or dry cooling tower 16.

The precooler coolant circuit includes an additional loop in which is positioned a secondary heat exchanger or after-cooler 17. The output of the pump 43 may also be applied to the after-cooler 17 and a valve 49 completes the extra loop in the primary coolant circuit to enable the output of the after-cooler 17 to be returned to the precooler 13.

The secondary heat exchanger 17 is also connected in a secondary coolant circuit 52 including a pump 53, a valve 55, and a delay reservoir 57. The size of the delay reservoir 57 is selected to provide a quantity of coolant in the secondary coolant circuit sufficient to provide for circulation of coolant therethrough in a single pass over a substantial period of time, for example, 8 hours in the instance discussed below. Baffles 59 inside of the reservoir 57 prevent mixing of the incoming coolant with the outgoing coolant to allow for a temperature gradient between the outgoing coolant and the incoming coolant for reasons which will be explained below.

A refrigeration system 61 is provided for cooling the secondary coolant in the secondary coolant loop. For this reason, the secondary coolant loop includes an evaporator 63, the inlets and outlets of which are controlled by valves 65 and 67, respectively. The refrigeration system also includes a compressor 69 and a condenser 71 providing a tertiary coolant loop. A bypass 73 including a control valve 75 directs coolant from the output of the after-cooler 17 in the primary coolant circuit through the condenser 71 of the refrigeration circuit 61 and back to the inlet of the heat exchanger or dry-cooling tower 16, for reasons which will be explained below.

During periods of normal load demand and mean ambient temperatures, the system of the invention may be operated in a so-called normal mode. In this condition, the valves 49 and 75 are closed and the valve 45 is open. In this condition, the primary coolant in the primary coolant circuit flows through the precooler 13, is cooled adequately in the heat exchanger or dry-cooling tower 16, and is pumped back to the precooler through the valve 45 by the pump 43.

During what is typically an eight-hour period in the middle of the day, peak load demand occurs. Unfortunately, this period usually coincides with the period of highest ambient temperature. Therefore the ability of the heat exchanger or dry-cooling tower 16 to cool the primary coolant in the primary coolant circuit is lessened. To compensate for the lessening of the cooling capcity of the dry-cooling tower 16, the system is operated in a so-called peak load mode. In this mode of operation, the valves 45 and 75 are closed whereas the valve 49 is open. In this condition, the after-cooler 17 is included in the primary coolant circuit with the pump 43 providing the output of the dry-cooling tower 16 to the after-cooler 17. The output of the after-cooler 17 then circulates back to the precooler through the valve 49. At the same time, circulation of secondary coolant in the secondary coolant loop 52 through the after-cooler 17 provides cooling of the primary coolant. In this mode of operation, the valves 65 and 67 are closed whereas the valve 55 is open.

By providing sufficient delay capacity in the reservoir 57, the period of time during which cold coolant is available for circulation through the after-cooler may be as required. Typically, eight hours will be sufficient to provide the necessary cooling in the after-cooler 17 over the period of time during which peak load occurs. Thus, the operating efficiency of the gas turbine system is maintained at a high level as a result of adequate cooling in the precooler 13 to meet peak load requirements.

During the cooler night-time periods, electrical load demand is substantially reduced. During this period the invention takes advantage of the low demand load to cool the coolant in the secondary coolant circuit for storage and further use during the period of peak demand. In the low load demand mode, the valve 49 is closed and valve 45 is regulated such that only the amount of coolant necessary to provide the proper cooling in the precooler 13 is directed thereto and circulated back to the dry-cooling tower 16. Because of the low electrical demand during the low ambient temperatures of night-time, the plant output is reduced and the capability of the dry-cooling tower to provide the necessary cooling may typically require only about 40% of the circulating water coolant capacity.

The remaining portion of the coolant, for example 60% is circulated through the after cooler 17. Return is provided by opening the valve 75 and directing the coolant through the bypass 73 and thereby through the condenser 71. Coolant then returns to the inlet side of the dry-cooling tower 16.

Thus circulated, the cooling effect of the dry-cooling tower 16 is used to assist in cooling the secondary coolant in the secondary loop by passing through the after-cooler 17. The cooling effect of the dry-cooling tower is used also to assist the operation of the refrigeration system 61 by withdrawing heat from the refrigerant in the system 61 through the condenser 71.

At the same time, the valve 55 is closed and the valves 65 and 67 are open so that the secondary coolant in the secondary coolant circuit is passed by the pump 53 through the evaporator 63, thus providing additional cooling of the secondary coolant by the refrigeration system 61. The power required to operate the refrigeration system through operating the compressor 69 is thus utilized during the period of low electrical load demand. Accordingly, the secondary coolant in the secondary coolant circuit is chilled and stored in the delay reservoir 57 for use during the peak load demand period.

Assuming a maximum daytime temperature of 95° F. (35° C.) mean and a minimum night-time temperature of 65° F. (19° C.) mean, the system of the invention is capable of increasing the performance of a gas turbine high temperature gas-cooled reactor system by 100 mw(e) output during an eight-hour period. This increase in power output can be adjusted to coincide with the peak electrical load for each day, thus effectively using the stored night-time capacity during the peak electrical demand period. Typically, the primary and secondary coolant will be water, whereas the coolant in the refrigeration system will be ammonia or some other suitable refrigerant. The primary coolant will typically be pressurized at approximately 300 psia (20 kg/sq.cm) whereas the secondary coolant will typically be at or close to atmospheric.

Within the embodiment of FIG. 2, hot gases are circulated in ducts 111 through a primary heat source 113 which may comprise a nuclear reactor or a fossil fuel burning furnace, for example. The hot gases in the ducts 111 are circulated through two heat exchangers 115 and 117 which may conventionally comprise a reheater and combined evaporator-economizer and super-heater respectively. The hot gases are then returned through the ducts 111 to the primary heat source 113.

The working fluid circuit 119 including the above elements circulates working fluid, preferably steam, from the heat exchanger 117 to a high pressure or first-stage steam turbine 121. After expansion within the turbine 121, the steam is circulated through the heat exchanger or reheater 115 and returned to a low pressure or second stage turbine 123 where additional work is developed from the steam.

The working fluid circuit 119 also includes a condenser 125 through which the working fluid is circulated after expansion in the turbine 123. According to conventional practice, the condenser 125 is used to remove heat from the steam and condense it to water which is returned by a pump 127 to the heat exchanger 117. The condenser 125 thus serves as the heat removal means in the working fluid circuit 119, corresponding to the function of the precooler 13 in the embodiment of FIG. 1.

For the purpose of cooling the heat removal means or condenser 125 in FIG. 2, similar means are employed as in the embodiment of FIG. 1 described above. Accordingly, those elements in FIG. 2 which correspond to substantially similar elements in FIG. 1 are identified by similar primed numerals. For example, a closed loop primary coolant circuit 14' including a primary heat exchanger or dry-cooling tower 16' is connected with the condenser 125. An additional loop including a secondary heat exchanger or after-cooler 17' is provided within the coolant loop 14'. Valves 45' and 49' regulate the circulation of fluid from the condenser 125 through the tower 16' or the tower 16' and secondary heat exchanger 17' under the influence of the pump 43'.

The secondary heat exchanger 17' is similarly connected within a secondary coolant circuit 52' including a pump 53', a valve 55', and a delay reservoir 57' which may preferably be provided with baffles 59'.

A refrigeration system 61' is provided within the secondary coolant circuit 52' and comprises an evaporator 63' connected in parallel with the valve 55', additional valves 65' and 67' being arranged in series with the inlet and outlet for the evaporator 63'. The refrigeration system 61' also includes a compressor 69' and a condenser 71' providing a tertiary coolant loop. A bypass 73' including a control valve 75' selectively directs coolant from the after-cooler 17' through the condenser 71' of the refrigeration circuit 61' for direct return to the dry cooling tower 16'.

The various components within the coolant circuit for the embodiment of FIG. 2 serve substantially similar functions as the corresponding components in FIG. 1. However, the sizing and operating characteristics of the various components in the cooling circuit of FIG. 2 may be modified as necessary in order to conform with the specific operating characteristics of the steam power plant of FIG. 2.

To summarize, the present invention provides a cold storage technique for increased performance during daily peaking of load demand by extending the night-time capacity of the power generating system for use in the day time peak periods. In effect, the system extends the heat rejection capacity of the dry cooling tower and permits maximum plant performance throughout a 24-hour period. During the night or low power demand period, the storage tank water transfers the stored heat through the after-cooler and water chiller system to the dry-cooling tower. Thus, the rejection capacity of the dry-cooling tower heat is maximized throughout the 24-hour period.

Various modifications of the invention in addition to those shown and described herein will become apparent to those skilled in the art from the foregoing description and accompanying drawings. Such modifications are intended to fall within the scope of the appended claims.

What is claimed is:

1. In a power plant having heat removal means in a working fluid circuit, a closed loop primary coolant circuit for circulating a coolant through said heat removal means, said primary coolant circuit including a primary heat exchanger for cooling and coolant therein, a secondary heat exchanger, and adjustable means for selectively directing at least a portion of a primary coolant in said primary coolant circuit through said secondary heat exchanger for further cooling the primary coolant and thereby increasing heat rejection capacity of said primary heat exchanger and said closed loop primary coolant circuit.

2. A power plant according to claim 1 and further comprising a closed loop secondary coolant circuit for circulating a secondary coolant through said secondary heat exchanger.

3. A power plant according to claim 2 and further comprising a refrigeration system for cooling said secondary coolant.

4. A power plant according to claim 2 and further comprising a delay reservoir in said secondary coolant circuit for storing a quantity of the secondary coolant sufficient to provide cooling of primary coolant for a substantial period of time.

5. A power plant according to claim 1 and further comprising a closed loop secondary coolant circuit for circulating a secondary coolant through said secondary heat exchanger, a delay reservoir in said secondary coolant circuit for storing a quantity of the secondary coolant sufficient to provide cooling of the primary coolant for a substantial period of time, said directing means including bypass means for selectively bypassing at least a portion of the primary coolant around said precooler and through said secondary heat exchanger for cooling the secondary coolant in said secondary coolant circuit.

6. A power plant according to claim 5 and further comprising a refrigeration system for cooling said secondary coolant.

7. A power plant according to claim 6 and further comprising a tertiary heat exchanger in said refrigeration system, said bypass means being coupled to said tertiary heat exchanger for transferring heat from said refrigeration system to the portion of the primary coolant circulated by said bypass means.

8. A power plant according to claim 1 wherein said working fluid is steam and wherein said heat removal means comprises a condenser.

9. A closed cycle gas turbine system comprising, turbine means, compressor means, means connected with said turbine means and said compressor means for circulating a gas for expansion in said turbine means and compression in said compressor means, a precooler for cooling the gas prior to compression in said compressor means, a closed loop primary coolant circuit for circulating a coolant through said precooler, said primary coolant circuit including a primary heat exchanger for cooling the coolant therein, a secondary heat exchanger, and adjustable means for selectively directing at least a portion of the primary coolant in said primary coolant circuit through said secondary heat exchanger for further cooling the primary coolant and thereby increasing heat rejection capacity of said primary heat exchanger in said closed loop primary coolant circuit.

10. A closed cycle gas turbine system according to claim 9 including a closed loop secondary coolant circuit for circulating a secondary coolant through said secondary heat exchanger.

11. A closed cycle gas turbine system according to claim 10 including a refrigeration system for cooling said secondary coolant.

12. A closed cycle gas turbine system according to claim 10 including a delay reservoir in said secondary coolant circuit for storing a quantity of the secondary coolant sufficient to provide cooling of primary coolant for a substantial period of time.

13. A closed cycle gas turbine system according to claim 9 including a closed loop secondary coolant circuit for circulating a secondary coolant through said secondary heat exchanger, a delay reservoir in said secondary coolant circuit for storing a quantity of the secondary coolant sufficient to provide cooling of the primary coolant for a substantial period of time, said directing means including bypass means for selectively bypassing at least a portion of the primary coolant around said precooler and through said secondary heat exchanger for cooling the secondary coolant in said secondary coolant circuit.

14. A closed cycle gas turbine system according to claim 13 including a refrigeration system for cooling said secondary coolant.

15. A closed cycle gas turbine system according to claim 13 including a refrigeration system for cooling said secondary coolant, and a tertiary heat exchanger in said refrigeration system, said bypass means being coupled to said tertiary heat exchanger for transferring heat from said refrigeration system to the portion of the primary coolant circulated by said bypass means.

16. A closed cycle gas turbine system comprising, turbine means, compressor means, means for circulating a gas for expansion in said turbine means and compression in said compressor means, a precooler for cooling the gas prior to compression in said compressor means, a closed loop primary coolant circuit for circulating a coolant through said precooler, said coolant circuit including a primary heat exchanger for cooling the coolant therein, a secondary heat exchanger, a closed loop secondary coolant circuit for circulating a secondary coolant through said secondary heat exchanger, means for selectively directing at least a portion of the primary coolant in said primary coolant circuit through said secondary heat exchanger for further cooling the primary coolant, a delay reservoir in said secondary coolant circuit for storing a quantity of the secondary coolant sufficient to provide cooling of the primary coolant for a substantial period of time, a refrigeration system for cooling the secondary coolant, said refrigeration system including a tertiary heat exchanger, said directing means including bypass means for selectively bypassing at least a portion of the primary coolant around said precooler and through said secondary heat exchanger for cooling the secondary coolant in said secondary coolant circuit, said bypass means being coupled to said tertiary heat exchanger for removing heat from said refrigeration system to the portion of the secondary coolant circulated by said bypass means.

* * * * *

UNITED STATES PATENT AND TRADEMARK OFFICE
CERTIFICATE OF CORRECTION

PATENT NO. : 4,144,723

DATED : March 20, 1979

INVENTOR(S) : David C. Morse and
Daniel L. Vrable

It is certified that error appears in the above—identified patent and that said Letters Patent are hereby corrected as shown below:

Column 3, Line 12, "mega-watts" should read --megawatts--.

Column 7, Line 20, "cooling and" should read --cooling the--.

Signed and Sealed this

Second Day of October 1979

[SEAL]

Attest:

RUTH C. MASON
Attesting Officer

LUTRELLE F. PARKER
Acting Commissioner of Patents and Trademarks